United States Patent
Yankelovich

(10) Patent No.: US 12,340,159 B2
(45) Date of Patent: Jun. 24, 2025

(54) CONTEXT-BASED INTEGRATED-CIRCUIT MODEL FOR EFFICIENT ELECTRICAL RULE CHECKING (ERC)

(71) Applicant: MELLANOX TECHNOLOGIES, LTD., Yokneam (IL)

(72) Inventor: Israel Albert Yankelovich, Hinnanit (IL)

(73) Assignee: Mellanox Technologies, Ltd., Yokneam (IL)

( * ) Notice: Subject to any disclaimer, the term of this patent is extended or adjusted under 35 U.S.C. 154(b) by 848 days.

(21) Appl. No.: 17/246,735

(22) Filed: May 3, 2021

(65) Prior Publication Data
US 2022/0350948 A1    Nov. 3, 2022

(51) Int. Cl.
*G06F 30/367* (2020.01)
*G06F 30/398* (2020.01)
*G06F 119/06* (2020.01)

(52) U.S. Cl.
CPC .......... *G06F 30/367* (2020.01); *G06F 30/398* (2020.01); *G06F 2119/06* (2020.01)

(58) Field of Classification Search
CPC ... G06F 30/367; G06F 30/398; G06F 2119/06
See application file for complete search history.

(56) References Cited

U.S. PATENT DOCUMENTS

| 7,162,703 | B1 | 1/2007 | Aik | |
| 7,240,316 | B2 | 7/2007 | Reginer | |
| 7,934,187 | B1 * | 4/2011 | Roberts | G06F 30/398 |
| | | | | 703/19 |
| 8,805,777 | B2 * | 8/2014 | Hajare | G06F 16/215 |
| | | | | 707/609 |

OTHER PUBLICATIONS

Whitney, "A Hierarchical Design Rule Checker," M.A. Thesis, Computer Science Department, California Institute of Technology, pp. 1-62, May 19, 1981.

* cited by examiner

*Primary Examiner* — Brian S Cook
(74) *Attorney, Agent, or Firm* — Meitar Patents Ltd.; Daniel Kligler

(57) ABSTRACT

A method for checking electrical rules in a design of a circuit including transistors connected by nodes, includes defining a hierarchical database including (i) a root representing the circuit, and (ii) instances of context-cells representing design entities and including node-ports that connect the design entities. Electrical properties of the node-ports are propagated from the root through the node-ports to at least a portion of the context-cells. The electrical properties, which were propagated from the root, are propagated from one or more of the context-cells to one or more peer context-cells. An electrical rule violation in at least one of the context-cells is identified based on the propagated electrical properties.

9 Claims, 5 Drawing Sheets

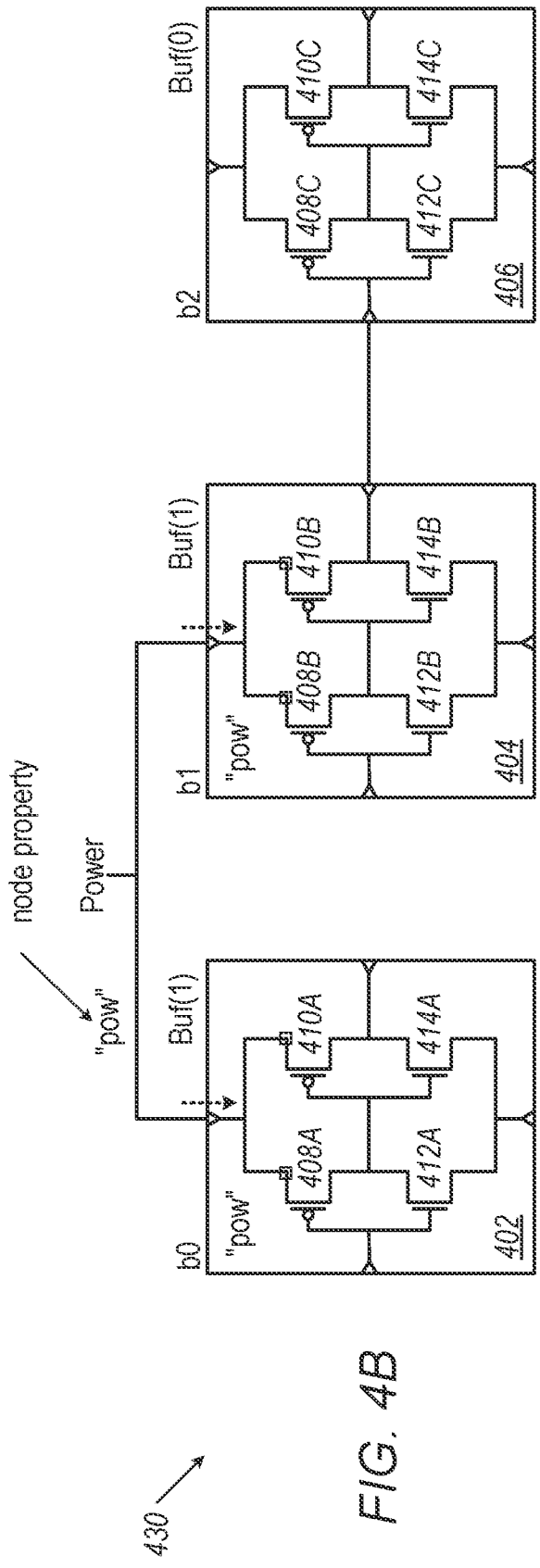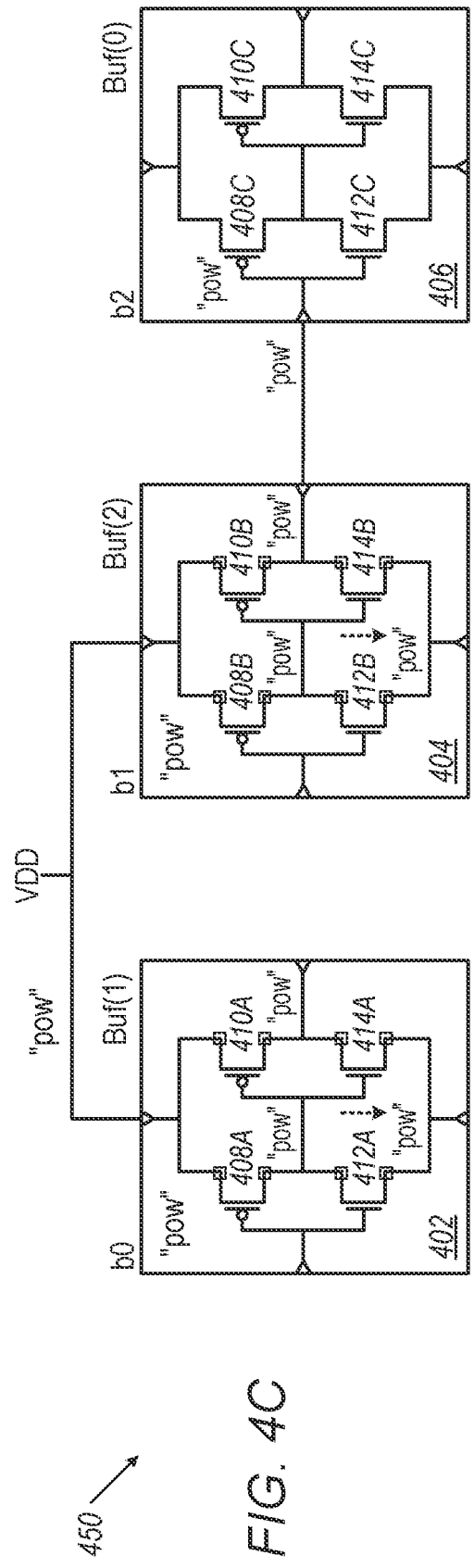
FIG. 4B
FIG. 4C

CONTEXT-BASED INTEGRATED-CIRCUIT MODEL FOR EFFICIENT ELECTRICAL RULE CHECKING (ERC)

FIELD OF THE INVENTION

The present invention relates generally to design of integrated circuits, and specifically to integrated circuit models that facilitate efficient electrical-rule check (ERC).

BACKGROUND OF THE INVENTION

In VLSI design, various physical verification checks (sometimes called "sign-off checks") typically take place before the design is committed to manufacturing. As modern integrated circuits may comprise numerous transistors (sometimes more than one billion), such checks may consume a large amount of computer resources and run for many hours.

U.S. Pat. No. 7,162,703 describes a method and apparatus for rule checking systems that validate an electronic design, in which information is extracted from a plurality of nodes in a netlist and stored with a set of predefined rules to share in a rule checking engine; the rule checking engine includes a generic routine for executing rules having a simple format; a user may enter new rules in the form of one or more simple conditions that can be matched against any node in an electronic design under consideration.

In U.S. Pat. No. 7,240,316 the inventors describe an apparatus and a method to determine locations where verification data should exist in a circuit representation, and then propagate verifications or circuit properties within the circuit representation, creating a minimum number of modified circuit entities and adding the entities to the hierarchical representation of the circuit such that pertinent critical net and property information is represented in each hierarchical level.

SUMMARY OF THE INVENTION

An embodiment of the present invention that is described herein provides a method for checking electrical rules in a design of a circuit including transistors connected by nodes. The method includes defining a hierarchical database including (i) a root representing the circuit, and (ii) instances of context-cells representing design entities and including node-ports that connect the design entities. Electrical properties of the node-ports are propagated from the root through the node-ports to at least a portion of the context-cells. The electrical properties, which were propagated from the root, are propagated from one or more of the context-cells to one or more peer context-cells. An electrical rule violation in at least one of the context-cells is identified based on the propagated electrical properties.

In an embodiment, propagating the electrical properties to the peer context-cells includes propagating the electrical properties from one or more of the context-cells to one or more intermediate-cells in the hierarchical database, and propagating the electrical properties from the intermediate-cells to the peer context-cells. In another embodiment, identifying the electrical rule violation includes determining a source of the electrical rule violation in the circuit, by back-tracing the violation through the hierarchical database.

In some embodiments, the method further includes splitting a context-cell into at least two instances responsively to propagating different electrical properties to the context cell. Additionally or alternatively, the method may further include merging instances of a context-cell responsively to propagating identical electrical properties to the instances.

There is additionally provided, in accordance with an embodiment of the present invention, an apparatus for checking electrical rules in a design of a circuit including transistors connected by nodes. The apparatus includes a memory and a processor. The memory is configured to store a hierarchical database including (i) a root representing the circuit, and (ii) instances of context-cells representing design entities and including node-ports that connect the design entities. The processor is configured to propagate electrical properties of the node-ports from the root through the node-ports to at least a portion of the context-cells, to propagate the electrical properties, which were propagated from the root, from one or more of the context-cells to one or more peer context-cells, and to identify an electrical rule violation in at least one of the context-cells based on the propagated electrical properties.

There is also provided, in accordance with an embodiment of the present invention, a computer software product, the product including a tangible non-transitory computer-readable medium in which program instructions are stored, which instructions, when read by a processor, cause the processor to define a hierarchical database including (i) a root representing the circuit, and (ii) instances of context-cells representing design entities and including node-ports that connect the design entities, to propagate electrical properties of the node-ports from the root through the node-ports to at least a portion of the context-cells, to propagate the electrical properties, which were propagated from the root, from one or more of the context-cells to one or more peer context-cells, and to identify an electrical rule violation in at least one of the context-cells based on the propagated electrical properties.

The present invention will be more fully understood from the following the detailed description of the embodiments thereof, taken together with the drawings in which:

BRIEF DESCRIPTION OF THE DRAWINGS

FIG. 4B is a block diagram of the three-buffer circuit, after a first stage of property propagation, in accordance with an embodiment of the present invention;

FIG. 4C is a block diagram of the three-buffer circuit, after a third stage of property propagation, in accordance with an embodiment of the present invention.

DETAILED DESCRIPTION OF EMBODIMENTS

Overview

Figure 1:
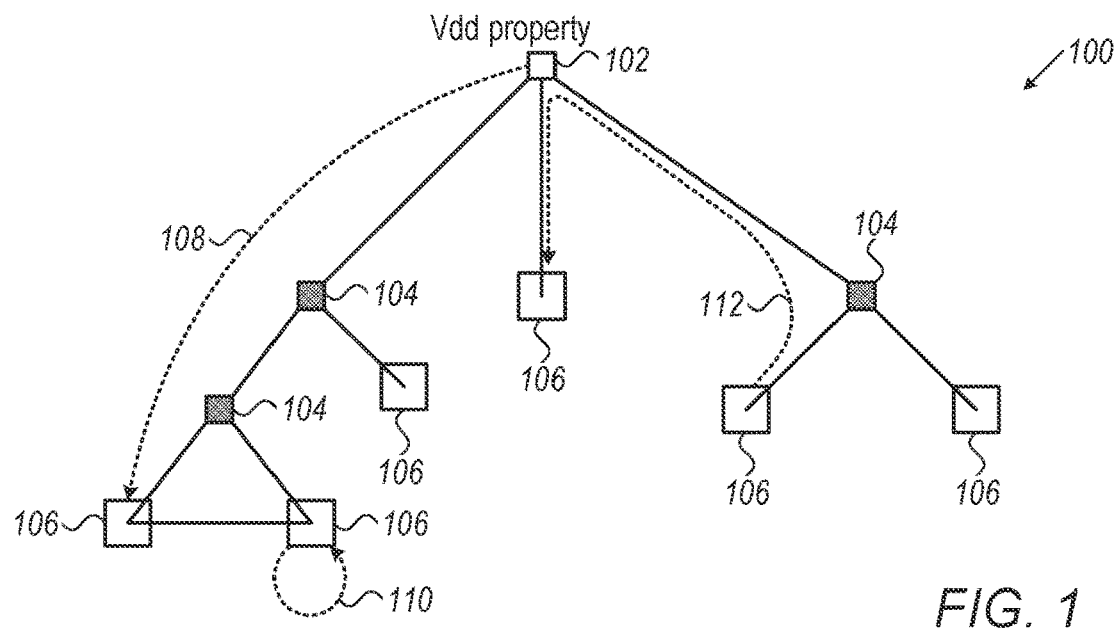
FIG. 1 is a block diagram that schematically illustrates the structure of a hierarchy tree of an integrated circuit (IC), in accordance with an embodiment of the present invention.

With the advent of modern semiconductor manufacturing techniques, the Non-Recurring Engineering (NRE) cost of high-density ICs is often in the range of millions or tens of millions of dollars, and, hence, IC designs are vigorously tested prior to committing to silicon.

One of the more demanding testing disciplines, usually dubbed "sign-off checks", includes running various tests, such as Design-Rule-Check (DRC), Electrical Rule Check (ERC), Layout Versus Schematics (LVS) and others, on the complete design database.

However, modern ICs sometimes comprise one billion or more transistors, a size that imposes a challenge on the sign-off tests. In particular, sign-off tests that flatten the design database may consume a gigantic amount of memory and run for days.

Methods and apparatuses in accordance with embodiments of the present invention provide for efficient ERC testing of complex ICs. In some embodiments, a context-based model of the IC is built, comprising a hierarchy of context cells, wherein the top-level cell represents the complete IC design, and the cells at the bottom of the hierarchy structure represent atomic-design entities such as transistors; the top-level cell is referred to as "root" and the atomic design entities at the bottom of the hierarchy are referred to as "bottom-hierarchy cells".

In embodiments, the context-based model is conveniently written in a high-level object-oriented programming language that supports inheritance (e.g., C++). To check an ERC rule, a processor that runs an ERC program assigns a property (e.g., a supply voltage) to the root cell, and then propagates the property down the hierarchy to all connected context cells. Alternatively, or additionally, the processor may assign the property to a lower level cell, and then propagate the property up and down.

The processor further propagates the property within the context cells (e.g., between transistors' sources and drains) and between context cells. In an embodiment, when the propagation is completed, the processor checks if any of the context cells detects a condition which is predefined as an ERC violation (e.g., a transistor port is not connected to a power by a propagation path).

The disclosed technique is efficient as it does not flatten the model. When two instances of identical cells get different properties, the ERC program splits the cell, but otherwise, only a single occurrence of any context cell needs to be evaluated.

System Description

We will disclose below the implementation of an Electrical Rule Check (ERC) of an IC; the disclosed techniques, however, are not limited to ERC and may be employed, mutatis mutandis, to other sign-off tests, including (but not limited to) design Rule Test (DRC), and Layout Versus Schematic (LVS).

In a typical ERC test, the design is tested against a set of electrical rules; for example, some tests may verify that the drains of all transistors are connected, directly or indirectly, to a supply port of the IC. In another example, the ERC program verifies that there is no route connecting a high supply voltage to the gate of any thin-oxide transistor.

In embodiments, a hierarchical model of the IC is pre-built, using a programming language, which, preferably, supports properties and propagation of properties (e.g., C++). The top level of the hierarchy will be referred to as "root" and comprises the complete IC. The atomic design entities at the bottom of the hierarchy are represented by "context cells", which are configured to test predefined electrical rules.

FIG. 1 is a block diagram that schematically illustrates the structure of a hierarchy tree 100 of an integrated circuit (IC), in accordance with an embodiment of the present invention. The tree comprises a root 102, which may represent the complete IC; intermediate-level cells 104, and atomic design entities (e.g., transistors). The atomic-design entities may comprise nodes such as source, drain, gate and, sometimes, substrate. All cells are typically interconnected by leaves (solid lines). (Note that in embodiments the bottom cells are not necessarily atomic design units.)

To test electrical rules, a processor that runs an ERC program assigns properties to the root (e.g., a Power property, designated Vdd). The property recursively propagates through the tree. The example embodiment illustrated in FIG. 1 shows three type of propagations—a Down propagation 108, wherein the property propagates down the hierarchy (e.g., from the root) to a context cell; a side-propagation 110, wherein the property propagates between two nodes of the same cell; and an up-down propagation 112, wherein a property that has been propagated to a context cell (e.g., by a previous down-propagation) propagates up to a an intermediate cell and then down to another context cell.

The propagation of the property continues until the property reaches all connected context cells 106. We shall consider below two example properties—the first example property is supply voltage, which, in the present example, should propagate to all transistors; the second example property is high-voltage, which, in the present example, should not propagate to the gates of thin-oxide transistors. In the first example property, after the properties have propagated to all connected context cells, any cell that does not receive the property (and that is marked as a cell to which the supply property should propagate) may indicate an ERC violation. For the second example property, any context cell that receives a high-voltage property in a thin-oxide gate node may indicate a violation.

Thus, according to the example embodiment illustrated in FIG. 1 and described above, properties associated with electrical design rules may propagate in the context-based model until the properties reach all connected context-cells; at that point, the ERC program may check if any of the context cells detects a violation.

Figure 2:
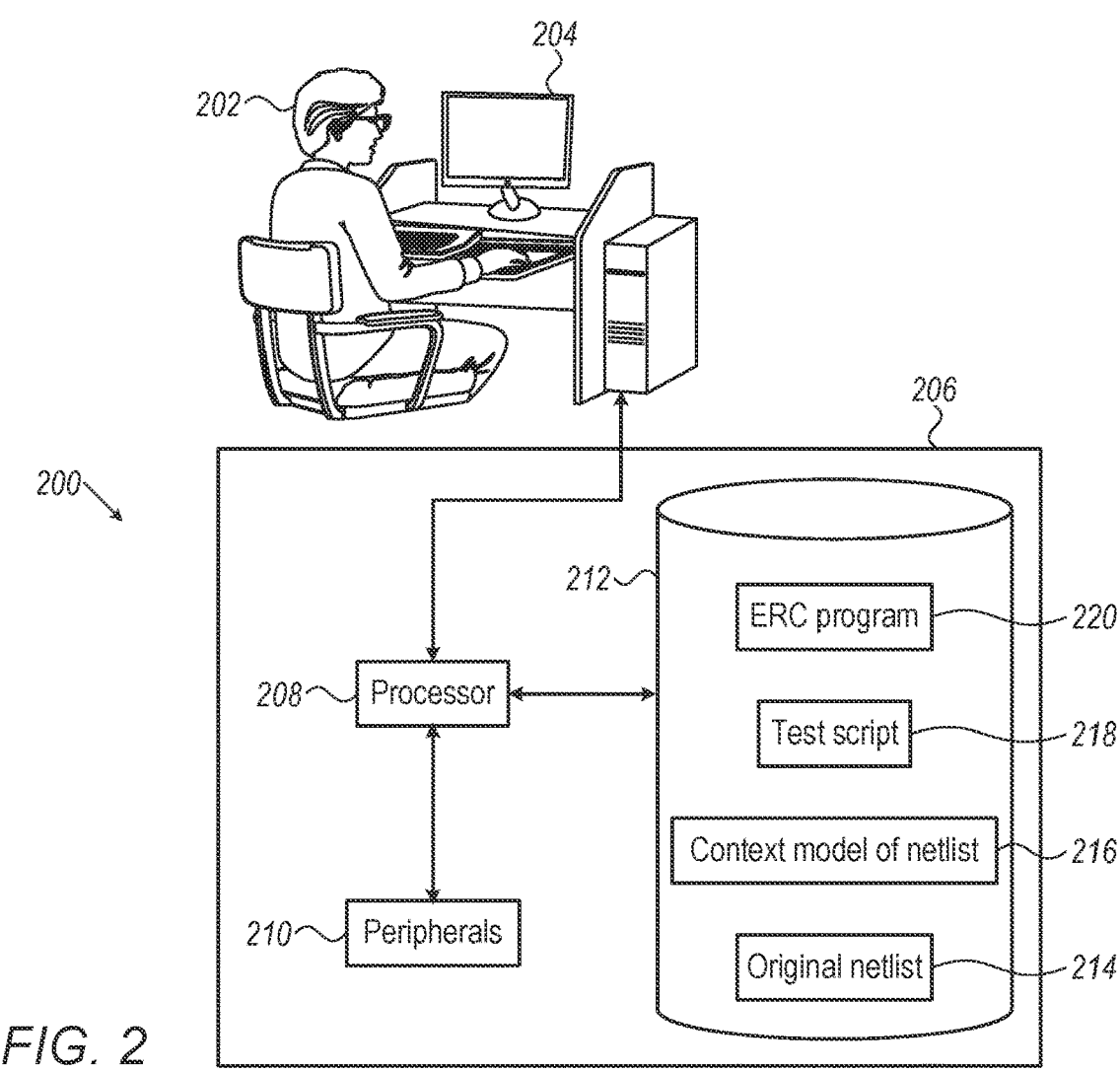
FIG. 2 is a block diagram that schematically illustrates a system for ERC testing of an IC design, in accordance with an embodiment of the present invention.

FIG. 2 is a block diagram that schematically illustrates a system 200 for ERC testing of an IC design, in accordance with an embodiment of the present invention. The system is operated by a user 202 (typically a Quality Assurance (QA) engineer), who communicates through a terminal 204 with a computer 206.

Computer 206 typically comprises one or more programmable processors 208, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In addition to processors 208, computer 206 comprises one or more peripherals 210, and a memory 212. According to the example embodiment illustrated in FIG. 2, to run ERC tests, memory 212 stores the following: i) an Original Netlist 214, which describes the netlist of the IC (using, for example, Verilog, or Electronic Design Interchange Format (EDIF)), ii) a Context Model 216, which stores a translation of netlist 214 to a module written in a suitable programming language (e.g., C++), iii) a test script 218, comprising a list of the ERC rules that the user wishes to check, and iv) an ERC program 220, in which the ERC executable code is stored.

To run the ERC tests, processor 208 reads rules from test-script 218, and activates ERC program 220 for each rule. The ERC program then assigns one or more corresponding properties to the root node of context model 216 (e.g., for power-connectivity check, the ERC program may assign property "Vdd"). The ERC program will then propagate the property, using down, side and up-down propagations (described above, with reference to FIG. 1), and then check if any of the context cells detects a violation. The ERC program then indicates violations (or absence thereof) to user 202. The user may optionally run a violation tracing software, to locate the source of the ERC violation.

It should be noted that the memory requirements according to the example embodiment illustrated in FIG. 2 are much smaller than the size of a fully flattened design model. The original netlist 214 is hierarchical (and may be removed to secondary storage after translation to the context model). The context model 216 is hierarchical, and while it may grow during the propagation process (as will be explained below, identical cells that get different properties are duplicated), its size remains substantially smaller than the size of the fully flattened model (the size of a fully flattened one-billion transistor IC model, in some cases, may exceed 1.5 Tbyte and the size for two-billion transistor IC model may exceed 3 Tbyte).

It should additionally be noted that the processing time for of an ERC program that uses a hierarchical model may be considerably lower than that of ERC programs that use a flattened model of the design and typically process all instance of all devices.

Thus, according to the example embodiment illustrated in FIG. 2, users may run ERC tests of large size ICs using a hierarchical context model of the design, which consumes a relatively small memory space.

As would be appreciated, the structure of system 200 illustrated in FIG. 2 and described hereinabove is cited by way of example. In alternative embodiments various suitable structures may be used. For example, in some embodiments, memory 212 or parts thereof may be distributed in more than one computer; in some embodiments, the software tasks may be executed by more than one computer (for example, each computer may run a subset of the ERC tests).

Figure 3A:
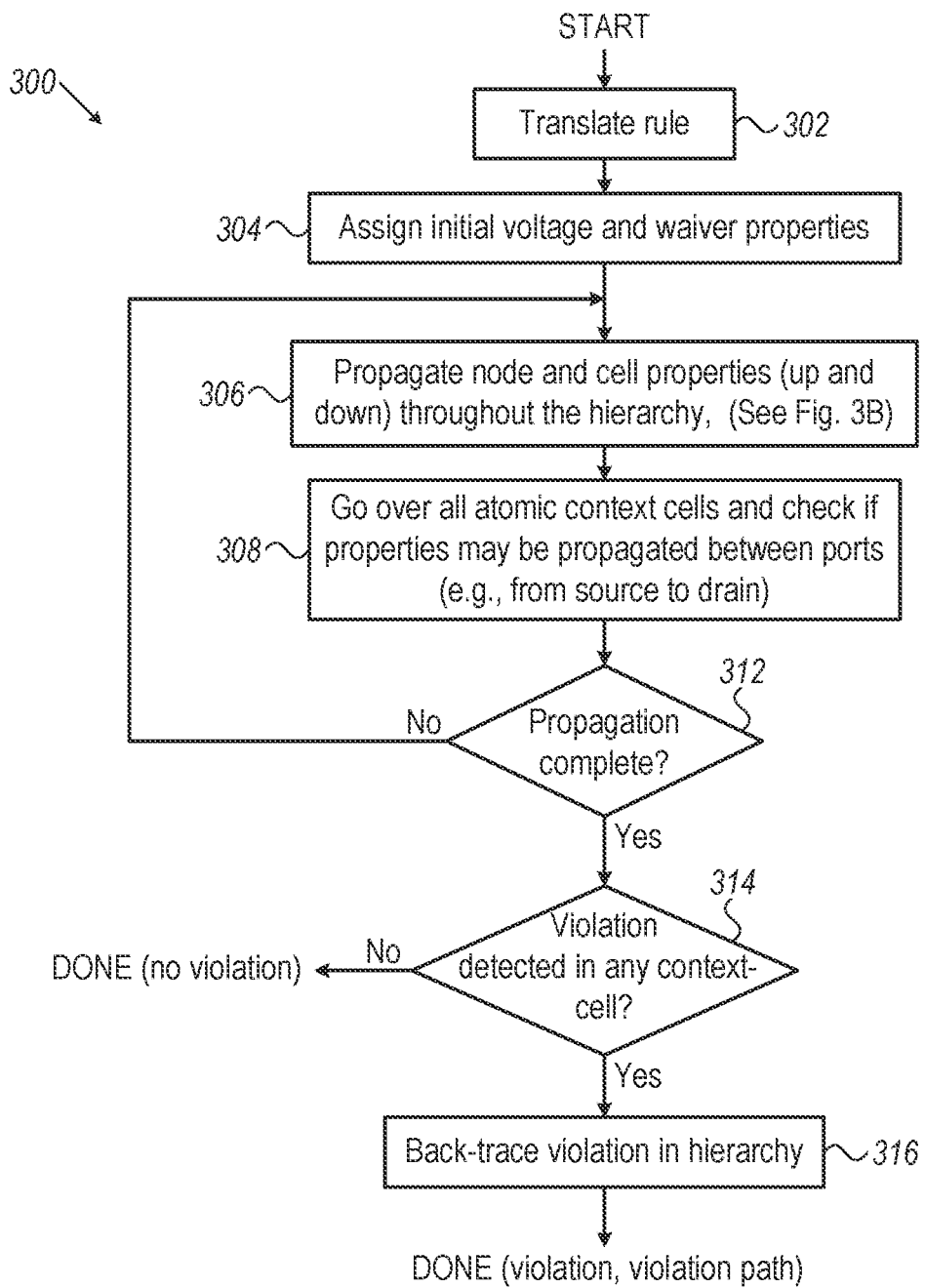
FIG. 3A is a flowchart that schematically illustrates a method for ERC testing, in accordance with an embodiment of the present invention.

FIG. 3A is a flowchart that schematically illustrates a method 300 for ERC testing, in accordance with an embodiment of the present invention. The flowchart is executed by processor 208 running ERC program 200, which runs on computer 206 (FIG. 2). We will refer in the description hereinbelow (pertaining to FIG. 3A) to C++ classes (and methods) that correspond to steps in the flowcharts; the classes are part of an example embodiment that will be described in a later section of this specification.

The flowchart starts at a Translate Rule step 302, wherein the ERC program translates an ERC rule to a property and to checks that are carried out by the context cells. The ERC program may receive the rule, for example from test-script 218 (FIG. 2), or directly from user 202. The ERC program then, in an Assign Initial Voltage step 304, assigns the rule to corresponding voltage properties that are assigned to the corresponding context cells.

Next, in a Propagate Node and Cell Properties step 306, the ERC program propagates the node and cell properties throughout the hierarchy, to all connected cells (CtxModel: doTasks( )), and enters a Check port-to-port Propagation step 308, wherein properties may propagate within context cells; e.g., from the source to the drain of the same transistor (CtxModel:addNodePropTask( )).

Next, at a Check-Propagation-Complete step 312, the ERC program checks if property propagation is completed (If no propagation task is done registered in step 308 the propagation is deemed complete).

If, in step 312, propagation is not completed, the ERC program reenters Propagate Node and Cell Properties step 306 for a further propagation step. If, in step 312, the propagation is complete, the ERC program enters a Check Rule step 314, wherein the ERC program checks if any of the context cells detects a violation. If no cell detects a violation, the ERC check is successful, and the ERC program may send a respective success message to the user (or append the success message in an ERC Results file). If any of the cells detects a violation, the ERC program enters a Back-Trace step 316, wherein the ERC program (or an auxiliary back-trace program) back-traces the cell in the hierarchy and generates a failure message that includes the location of the failing cell in the hierarchy.

Figure 3B:
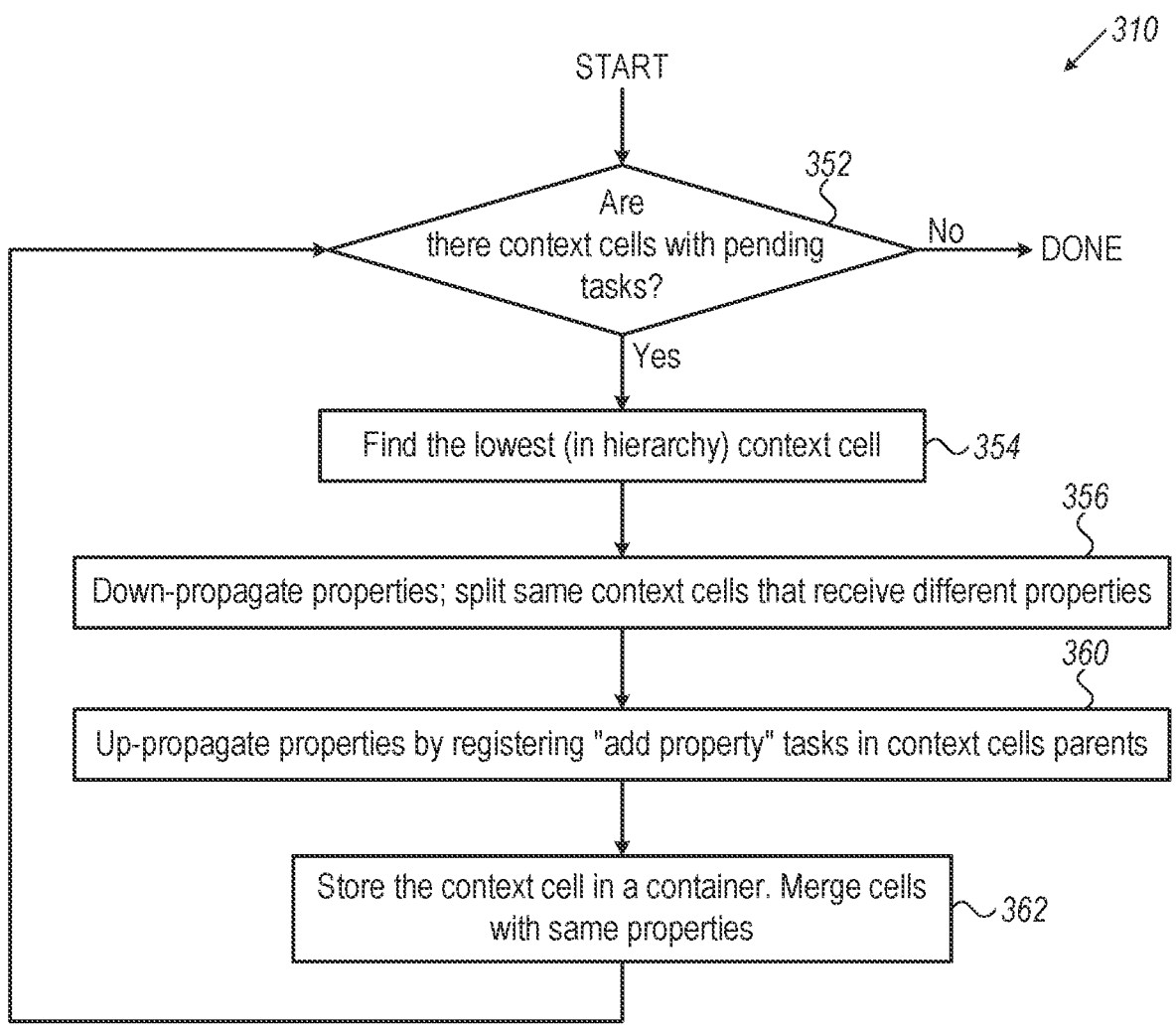
FIG. 3B is a flowchart that schematically illustrates a method for node property propagation, in accordance with an embodiment of the present invention.

FIG. 3B is a flowchart 310 that schematically illustrates a method for node and cell property propagation (corresponding class—CtxModel:doTasks( )), in accordance with an embodiment of the present invention. The flowchart is entered by the ERC program when executing flowchart 300 (in step 306, FIG. 3A). The flowchart starts at a Check Pending Tasks step 352, wherein the ERC program checks if there are any pending propagate-property tasks in any of the context cells. If there are no pending tasks, the flowchart ends.

If, in step 352, there are pending tasks in one or more context cells, the ERC program will enter a Find-Lowest-Cell step 354 and find which task is the lowest in the hierarchy from all context with pending tasks. The ERC program then, in a Down-Propagate step 356, propagates the properties down from the cell to all connected context cells. If the propagation changes properties of a cell, the ERC program will split the cell to two cells—one with the property and one without.

Next, in an Up-Propagate step 360, the ERC up-propagates the properties. According to the example embodiment illustrated in FIG. 3B, the ERC program does not directly store the up-propagated properties in the context cells; instead, the ERC program registers Add-Property tasks in the cell, which will then change the cell property in the next occurrence of steps 356 and 358.

Lastly, in a Store-Context-Cell step 362, the ERC program stores the processed context cell in a container, merging the cell with other identical-properties cells that may exist. After step 362 the ERC program reenters step 352, and checks if there are any remaining pending context cells with tasks.

During the execution of flowcharts 300 and 310, the number of cells in the context model expands and contracts. Prior to the propagation of properties, the number of cells in the context model is equal to the number of different cell types in the design (e.g., PMOS transistors), independently of how many times the cell is instantiated in the design. In step 356, the ERC program checks if any context cell receives non-identical properties and, if so, splits the cells, temporarily expanding the model size. In step 362, the ERC program may merge cells that were split if the cells get the same property, and the model contracts again, to its original size. It should be noted that although the model size temporarily expands, the expanded size is typically still much lower than the size of the flattened model.

As would be appreciated, flowcharts 300 and 310 illustrated in FIGS. 3A and 3B and described hereinabove are cited by way of example. Other suitable flowcharts may be used in alternative embodiments. In some embodiments, the order of the propagation steps may be different; in an embodiment, down, up and side propagations are intermixed. In embodiments, the cell splitting and/or merging is integrated in one or more of the propagation steps.

We will now proceed to describe a detailed example embodiment, with reference to FIGS. 4A through 4D. For simplicity, the context cells referenced by FIGS. 4A through 4D are buffers, each comprising four transistors, rather than the actual transistors. In alternative embodiments transistors may be used instead of the buffers, as context cells.

Figure 4A:
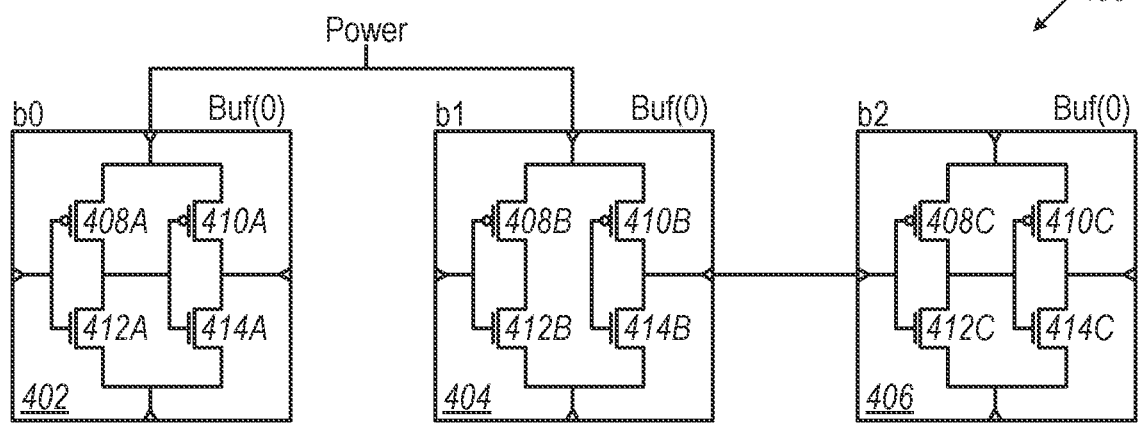
FIG. 4A is a block diagram of a three-buffer circuit, in accordance with an embodiment of the present invention.

FIG. 4A is a block diagram of a three-buffer circuit 400, in accordance with an embodiment of the present invention. The circuit comprises a buffer 402, a buffer 404 and a buffer 406. Buffer 402 comprises a PMOS transistor 408A, a PMOS transistor 410A, an NMOS transistor 412A and an NMOS transistor 414A. The three buffers are identical; buffer 404 comprising PMOS transistors 408B, 410B and NMOS transistors 412B, 414B; and buffer 406 comprising PMOS transistors 408C, 410C and NMOS transistors 412C, 414C.

According to the example embodiment illustrated in FIG. 4A, the three buffers 402, 404 and 406 are identical; in the original netlist 214 (FIG. 2), the three buffers may be three instances of the same buffer, and, in the context model, the three buffers are initially a single buffer, designated buf(0) in FIG. 4A.

However, according to the example embodiment illustrated in FIG. 4A, buffer b2 406 is not connected to a Power supply (designated POWER); in embodiments, buffer b2 violates an ERC constraint, which mandates that all Buf( ) instances should be connected to a power supply. We will next demonstrate how this ERC violation is detected by an ERC program according to embodiments of the present invention.

FIG. 4B is a block diagram of the three-buffer circuit 430, after a first stage of property propagation, in accordance with an embodiment of the present invention. The ERC program assigns a "pow" property to a Vdd node in root (the root boundary is not shown in the figure). The pow property propagates down the hierarchy (e.g., step 306, FIG. 3A) and reaches buffers b0 402 and b1 404 (e.g., the "pow" property is assigned to context cell buf(1) in the context model).

Property "pow", however, does not propagate to buffer b2 406. Hence, buffer b2 will cease to be identical to buffers b0 and b1. Therefore, in the Down-Propagate step 356 (FIG. 3B), the ERC program will generate a duplicated cell (designated buf(1)) for b0 402 and b1 404, which are now different from b2 406 (b2 will retain the designation buf(0)).

FIG. 4C is a block diagram of the three-buffer circuit 450, after a third stage of property propagation (the second stage is not shown), in accordance with an embodiment of the present invention. Property "pow" now propagates through the PMOS and NMOS transistors, to the indicated nodes within the two buffers. In addition, property "pow" may propagate from the source of transistor 410B to the gates of transistors 408C and 412C. As would be appreciated, the property propagation illustrated in FIG. 4C may comprise a plurality of propagation steps in FIGS. 3A and 3B.

Figure 4D:
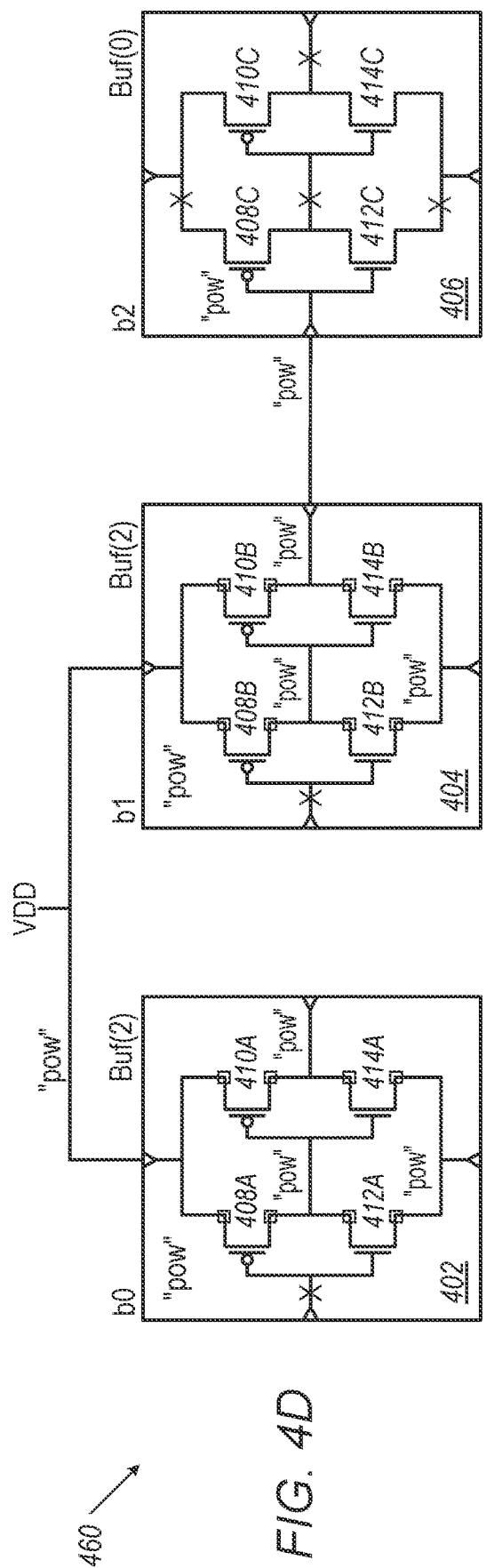
FIG. 4D is a block diagram of the three-buffer circuit in a check-violation stage, in accordance with an embodiment of the present invention.

FIG. 4D is a block diagram of the three-buffer circuit 460 in a check-violation stage, in accordance with an embodiment of the present invention. All propagations of property "pow" are now completed. The context cells now indicate which internal nodes do not get the "pow" property (designated "X" in the figure). Buffer b2 406 indicates that the "pow" property has not propagated to the drains and sources of transistors 408C, 410C, 412C and 414C, which may be interpreted as an ERC error. (It should be noted that the gates of transistors 408A, 412A, 408B and 412B do not get the property "pow" either. In some embodiments, these gates get property "pow" from other buffers that are not shown; in other embodiments, "pow" property violation detection may be marked as "waived" for various transistor ports in various instances of "buf".)

We will now proceed to present an example implementation of the context model and the respective ERC test operations. As mentioned above, embodiments of the present invention may comprise context models that are written in a variety of programming languages, which, preferably, support properties. In the disclosure hereinbelow we will describe a C++ implementation.

1. BASIC CLASSES AND MODELS

```
CtxModel: Context model
    CtxModel(const cdmCell *topCell) /* Construct
    context model from given top level folded cell */
    CtxCell *getTopCell( )// Get top context cell
    const CellList *getCellCtxs(const cdmCell *const
    foldCell)//Get context cells of folded cell
        CellList: list<CtxCell *>
    void addHierNodeProp(const cdmCell *foldCell,
    const Hier *hier, const cdmNode *node, const
    CtxPropKey *propKey, const CtxPropVal *propVal =
    propValNone) /* Add hierarchical node property in
    all context cells of folded cell*/
        Hier: list<const cdmInst *>
    void addHierCellProp(const cdmCell *foldCell,
    const Hier *hier, const CtxPropKey *propKey, const
    CtxPropVal *propVal = propValNone)/* Add
    hierarchical instance cell property in all context
    cells of folded cell*/
CtxCell: Context cell
    bool isTopCell( ) const /* Is this context model
    top cell? */
    void addNodeProp(const cdmNode *node, const
    CtxPropKey *propKey, const CtxPropVal *propVal =
    propValNone) // Add property to node
    void addCellProp(const CtxPropKey *propKey, const
    CtxPropVal *propVal = propValNone) /* Add property
    to cell */
    bool hasNodeProp(const cdmNode *node, const
    CtxPropKey *propKey) // Does node have property?
    const CtxProp *getNodeProp(const cdmNode *node,
    const CtxPropKey *propKey) /* Get prop in node by
    prop key */
    bool hasCellProp(const CtxPropKey *propKey) /*
    Does cell have property? */
    const CtxProp *getCellProp(const CtxPropKey
    *propKey) // Get prop in node by prop key
    const PropSet *getNodePropsList(const cdmNode
    *node, const CtxPropKeyType *propKeyType) /* Get
    node properties of specific type */
        PropSet: set<CtxProp>
    const PropSet *getCellPropsList(const
    CtxPropKeyType *propKeyType) /* Get cell
    properties of specific type */
    const CtxInst *getInst(const cdmInst *foldInst)/*
    Get context instance of fold instance */
    const MasterInsts *getMasterInsts( ) /* Get list of
    context instances of the cell */
        MasterInsts: list<CtxInst *>
    void addHierCellProp(const Hier *hier, const
    CtxPropKey *propKey, const CtxPropVal *propVal =
    propValNone) /* Add hierarchical instance cell
    property */
    void addHierNodeProp(const Hier *hier, const
    cdmNode *node, const CtxPropKey *propKey, const
    CtxPropVal *propVal = propValNone) /* Add
    hierarchical node property */
```

```
        bool hasHierNodeProp(const Hier *hier, const
        cdmNode *node, const CtxPropKey *propKey) /* Does
        hier node have property? */
        bool hasHierCellProp(const Hier *hier, const
        CtxPropKey *propKey): /* Does hierarchical cell
        have property? */
        const PropSet *getHierNodePropsList(const Hier
        *hier, const cdmNode *node, const CtxPropKeyType
        *propKeyType) /* Get hierarchical node properties
        of specific type */
    CtxInst: Context instance
        CtxCell *getMaster( )// Get instance context cell
        CtxCell *getCell( ) /* Get context cell in which
        the instance is placed */
2. CONTEXT PROPERTY CLASSES /* Each stored property has a key and a value.
The user can derive the default property key and
property value classes.
Properties are grouped by property key type. */
const CtxPropKeyType *
CtxModel::createPropKeyType(const string &typeName,
CtxPropKeyType::PropagDir propagDir = DOWN_UP) /*
Create new property key type. propagDir defines how
property is propagated through the hierarchy */
    CtxPropKeyType::PropagDir: enum {DOWN_UP, DOWN,
        NONE}
/*CtxPropKey is The property key stored in context
model cells and nodes */
    CtxPropKey(const CtxPropKeyType *type) /*
    Constructor of property key of specific type. Name
    used for debug and compare; type used to store
    user specific data and make casting based on type
    */
    virtual bool compare(const CtxPropKey *pk2) /*
    Compare keys, by default return false since have
    single property */
    virtual string getName( ) /* Get property key name
    for display. By default display property key type
    name */
CtxNamePropKey: // Derived from CtxPropKey
    CtxNamePropKey(const CtxPropKeyType *type, const
    string &name) // Construct key with name
CtxPropVal /* The property value stored in context
model cells and nodes */
    CtxPropVal( ): /* Constructor, no value stored by
    default */
    virtual bool compare(const CtxPropVal *pv2) /*
    Compare values; return false by default */
    virtual string getName( ) /* Get property value
    name for display; by default return "none" */
/* Property keys and values must be stored in specific
containers to allow fast comparison by unique pointer.
Properties stored in a container must have same type,
passed as template argument */
CtxPropKeyStore <typename PropKeyType> /* Property key
container used for fast key comparison */
    const PropKeyType *store(const PropKeyType
    &propKey) /* Store property key and get pointer to
    it */
    const PropKeyContainer &getProps( ) /* Get
    properties stored in container */
        PropKeyContainer: set<PropKeyType>
CtxPropValStore <typename PropValType> /* Prop value
container used for fast value comparison */
    const PropValType *store(const PropValType
    &propVal) /* Store property value and get pointer
    to it */
CtxProp /* The property that is actually stored in
context model */
    const CtxPropKey *getPropKey( )// Get property key
    const CtxPropVal *getPropVal( )// Get property
    value
    SrcType getSrcType( )// Get property source type
        SrcType: enum {user, below, above}
        // user: Set by user algorithm
        // below: Set from below by inst port
        //   returned by getSrcInstPort( )
        // above: Set from above by port in node
        const cdmInstPort *getSrcInstPort( )// Get source
        inst port for source type == below */
3. ADD PROPERTY TASKS /* To avoid intermediate error states, we register the
task of property addition and perform it later */
    CtxModel ctxModel; cdmCell *deviceFoldCell;
    cdmNode *drnNode; CtxPropKey *powerProp;
    // Go for each context cell of folded device cell
    deviceFoldCell
    const CtxModel::CellList *ctxCellsList =
    ctxModel.getCellCtxs(deviceFoldCell);
    for (CtxModel::CellList::const_iterator
    ctxCellIter = ctxCellsList->begin( ); ctxCellIter
    != ctxCellsList->end( ); ctxCellIter++) {
        CtxCell *deviceCtxCell = *ctxCellIter;
        if (/* some condition */) {
            deviceCtxCell->addNodePropTask(drnNode,
            powerProp);
        }
    }
    // Perform tasks
    ctxModel.doTaks( )
    /* an additional benefit of using task registration:
    Multiple properties addition at once */
CtxModel:
    void doTasks( ) // Perform registered tasks
    void addHierNodePropTask(const cdmCell *foldCell,
    const Hier *hier, const cdmNode *node, const
    CtxPropKey *propKey, const CtxPropVal *propVal =
    propValNone) /* Register task of adding
    hierarchical node property in all context cells of
    folded cell */
    void addHierCellPropTask(const cdmCell *foldCell,
    const Hier *hier, const CtxPropKey *propKey, const
    CtxPropVal *propVal = propValNone) /* Register
    task of adding property of hierarchical cell in
    all context cells of folded cell */
CtxCell:
    void addHierNodePropTask(const Hier *hier, const
    cdmNode *node, const CtxPropKey *propKey, const
    CtxPropVal *propVal = propValNone) /* Register
    task of adding hierarchical node property */
    void addHierCellPropTask(const Hier *hier, const
    CtxPropKey *propKey, const CtxPropVal *propVal =
    propValNone) /* Register task of adding property
    of hierarchical cell */
4. ADVANCED METHODS /* After call to CtxModel::doTasks( ) new cells are
created */
/* Option to get only new cells in order not to go over
old cells: */
    CellList::const_iterator
    CtxMode::getCellNewCtxsBegin(const cdmCell
    *foldCell) /*Get new context cells list beginning
        At beginning of CtxModel::doTasks( ) existing
        cells are defined as old */
    CellList::const_iterator
    CtxMode::getCellNewCtxsEnd(const cdmCell * const
    foldCell) // Get new context cells list end
```

Electrical Rule Check (ERC) Implementation

We will now proceed to describe an example implementation of an ERC program, based on the context model described above.

A Voltage (power) source is defined at the top level (root) power and input ports, including internally regulated power nodes. In some embodiments, voltage sources may have minimum and/or maximum voltage values. The voltage source is distributed hierarchically within the context model, propagating between cells and, in cells, through circuit element including (but not limited to) resistors, diodes (from anode to cathode) and transistors (the model assumes that the transistors can be switched on).

When multiple pass transistors are coupled to the same node (the design typically guarantees that only one of them will be switched on at any given time), the ERC program may define each pass transistor as unidirectional, to avoid false ERC errors.

ERC checks may include: i) all gates get power (including ground); ii) the voltage between any two transistor nodes is not above a given maximum; iii) the gate voltage of an NMOS transistor is not above the bulk voltage; and iv) the gate voltage of an PMOS transistor is not below the bulk voltage.

The checking of an ERC rule comprises: i) creating a context model; ii) adding initial properties to the voltage source nodes; iii) property propagation; iv) collect violations; and v) report violations (in some embodiments, a Waive property may be added to cells, which will then refrain from reporting the violations).

---

POWER NODE PROPAGATION EXAMPLE

```
// Create folded design into variable cdmDesign *design
// Get top cell
const cdmCell *topCell = design->getCellByName(<top cell name>);
// Create context model on top level
CtxModel ctxModel(topCell);
// Create power property
const CtxPropKeyType *powerPropKeyType =
ctxModel.createPropKeyType("powerKeyType");
CtxPropKeyStore<CtxNamePropKey> powerPropStore;
const CtxPropKey *powerProp =
powerPropStore.store(CtxNamePropKey(powerPropKeyType,
"power"));
// Add power property on top level VDD
const cdmNode *topVdd = topCell->getNodeByName("VDD");
ctxModel.getTopCell( )->addNodeProp(topVdd, powerProp);
// Prepare MOS devices list
const cdmCell *pmosDev = design->getCellByName("pmos");
const cdmCell *nmosDev = design->getCellByName("nmos");
list<const cdmCell *> devList;
devList.push_back(pmosDev); devList.push_back(nmosDev);
// Propagate through MOS devices
bool doPropags;
int steps = 0;
do {
    doPropags = false;
    // For each MOS device cell
    for (list<const cdmCell *>::const_iterator devIter =
devList.begin( ); devIter != devList.end( ); devIter++) {
        const cdmCell *devCell = *devIter;
        const cdmNode *srcNode = devCell-
>getNodeByName("SRC");
        const cdmNode *drnNode = devCell-
>getNodeByName("DRN");
        // For each MOS device new context cell
        CtxModel::CellList::const_iterator newCtxsBegin =
ctxModel.getCellNewCtxsBegin(devCell);
            CtxModel::CellList::const_iterator newCtxsEnd =
ctxModel.getCellNewCtxsEnd(devCell);
            for (CtxModel::CellList::const_iterator
ctxDevIter = newCtxsBegin; ctxDevIter != newCtxsEnd;
++ctxDevIter) {
                CtxCell *ctxDev = *ctxDevIter;
// Propagate property from SRC to DRN and from DRN to SRC
            if (ctxDev->hasNodeProp(srcNode, powerProp) && (!
ctxDev->hasNodeProp(drnNode, powerProp))) {
                ctxDev->addNodePropTask(drnNode, powerProp);
                doPropags = true;
            } else if (ctxDev->hasNodeProp(drnNode, powerProp)
&& (! ctxDev->hasNodeProp(srcNode, powerProp))) {
                ctxDev->addNodePropTask(srcNode, powerProp);
                doPropags = true;
            }
        }
    }
    // Perform propagation
    if (doPropags) {
        ctxModel.doTasks( );
        ++steps;
    }
} while (doPropags);
// Report number of propagation steps
LOG_print('I', "performed %d step/s", steps);
// Report nodes without property "power"
// For each used cell
const charp_cellp_map *cellsMap = design->getCellsMap( );
for (charp_cellp_map::const_iterator cellIter =
cellsMap->begin( ); cellIter != cellsMap->end( );
cellIter++) {
    const cdmCell *foldCell = cellIter->second;
    // For each context cell
    const CtxModel::CellList *foldCellCtxs =
ctxModel.getCellCtxs(foldCell);
    for (CtxModel::CellList::const_iterator ctxCellIter =
foldCellCtxs->begin( ); ctxCellIter != foldCellCtxs-
>end( ); ++ctxCellIter) {
        const CtxCell *ctxCell = *ctxCellIter;
        // For each node
        const charp_nodep_map *nodesMap = foldCell-
>getNodesMap( );
        for (charp_nodep_map::const_iterator nodeIter =
nodesMap->begin( ); nodeIter != nodesMap->end( );
nodeIter++) {
            const cdmNode *node = nodeIter->second;
            // If node has port, do not check it, since will be
checked from upper hierarchy
            if (node->getPort( ) && foldCell != topCell) {
                continue;
            }
// If node does not have property, report violation
            if (! ctxCell->hasNodeProp(node, powerProp)) {
                // Report all node occurrences
                reportAllNodeOccs(ctxCell, Hier( ), node);
            }
        } // for each node
    } // for each context cell
} // for each used folded cell
/* Recursively report all occurrences of node in context
cell */
void reportAllNodeOccs(const CtxCell *inCtxCell, const
Hier &hier, const cdmNode *node) {
/* If inCtxCell is model top level, report a single
violation */
    if (inCtxCell == inCtxCell->getModel( )->getTopCell( )) {
        cout << HierNode(hier, node).getNameWithCells( ) <<
"\n";
        return;
    }
    // Go for each instance of context cell
    const CtxCell::MasterInsts *masterInsts = inCtxCell-
>getMasterInsts( );
    for (CtxCell::MasterInsts::const_iterator
masterInstIter = masterInsts->begin( ); masterInstIter !=
masterInsts->end( ); masterInstIter++) {
        const CtxInst *ctxInst = *masterInstIter;
        Hier instHier = hier;
        instHier.push_front(ctxInst->getFoldInst( ));
        reportAllNodeOccs(ctxInst->getCell( ), instHier,
node);
```

---

Violation Tracing

In some embodiments, the ERC program is configured to trace the violation source and report the path of ERC violations. In embodiments, to enable path reporting, the voltage source property value in the node comprises three fields: i) a propagSrcType field, which indicates the origin of the property, and can assume a Start value (indicating that the property is in the voltage source node) or a Node property (indicating that the property was propagated from another node, traversing between devices); ii) a propagSrc-Node field, (when propagSrcType is Node)—stores the node from which the property was propagated; and iii) a propagSrcPropKey field (when propagSrcType is Node), storing the property key of the property in the source node that propagated to the current node.

Additional Implementation Detail

We disclose hereinbelow example implementations for some non-trivial functions of the context model.

---
Class CtxModel
---

CtxModel( )
    Construct context model with given top level fold cell
    Given: topFoldCell
    - Populate used cells vector cellUsed by iterating over topFoldCell cell instances and recursively calling the population for instance masters.
    - Create context cell for used cells and polulate cellCtxs
    - Populate the instances of each context cell
doTasks( )
    - Mark all cells as old
    // Replace hierarchical tasks by non-hierarchical tasks
    - taskCellsCopy = taskCells
    - For each taskCell in taskCellsCopy:
    -- Call taskCell->hierTasksToNohierTasks( )
    // Perform tasks of all cells
    - While taskCells is not empty:
    -- Pull out first taskCell
    -- Call taskCell->doTasks( )
splitMaster( )
    Create new master for instance to enable to change the instance master
    Given: splitForInst
    - If current context master has one instance (masterInsts), remove from context cells set umanageMaster( ) and return
    - Copy current context master (ctxMaster) to new context master. In new context master create new context instances objects and point them to same masters as in the source cell. Add new instances to their master instances list (masterInsts). Copy tasks from current to new context master. If have tasks, add new context master to task cells.
    - For old context master, remove context instance from list of master instances.
    - Point current instance to new context master (ctxMaster)
    - Add current instance to new context master instances (masterInsts)
unmanageCell( )
    Remove context cell from unique set of context cells (cellCtxs)
    Given: unmanCell
    - Find unmanCell in fold cell context cells container (cellCtxs)
    - Remove context cell from context cells container
    - Mark unmanCell as unmanaged
    // Unmanage cells in which unmanCell insts exists, since their order in context cells can change
    - For each unmanCell instance masterInst:
    -- Unmanage parent cell
    -- Add parent cell to cells to manage parentCell->cellToManage( )
manageCell( )
    Add/merge context cell to set of unique context cells
    Given: manCell
    - Search if context cell exists in cell context cells (cellCtxs). If does not exist:
    -- Add and give it a new cell index. Return.
    -- Clear node prop cell change map manCell->clearNodeChangeMap( )
    -- Return
    // Merge manCell (new cell) into cell that already exists in cellCtxs (old cell)
    - Update instances of new context cell (masterInsts) to point to old context cell
    - Move master instances of new context cell to old context cell master instances
    - Delete new cell ---
Class CtxCell
--- hierTasksToNohierTasks( )
    Convert hierarchical tasks to non-hierarchical tasks in order to simplify the add tasks algorithm
    - For each hierarchy, node, prop in tasksHierNodeProp:
    // Split instances down to cell containing node
    -- curCell = this
    -- For each foldInst in hierarchcy:
    --- Get context model inst
    --- model->splitMaster(inst)
    --- curCell = inst->getMaster( )
    // Add task for managing cell when all descendants will be managed
    --- curCell->cellToManage( )
    // Add no hier task
    -- curCell->addNodePropTask(node, prop)
    - tasksHierNodeProp.clear( )
doTasks( )
    - Construct node properties still not set: notSetNodeProp
    - Add node propertiess by calling addMultiNodeProp(notSetNodeProp)
    - Construct cell propertiess still not set: notSetCellHierProps
    - Add hierarchical cell properties by calling addMultiHierCellProp(notSetCellHierProps)
    - If the cell is not managed, manage it by calling model->manageCell(this)
addMultiNodeProp( )
    Given: multiNodeProp
    - Add multi node properties in cells lower in hierarchy: addMultiNodePropLowerRecur(multiNodeProp)
    // For nodes that have port, call set node property for each context instance parent
    - If the cell has master instances masterInsts:
    -- Create multi node property collection multiPortProp for nodes that have port and property distributes up
    -- For each cell inst masterInst:
    --- Create multi node property parentMultiNodeProp to add to the parent with parent nodes connected to the nodes in this cell
    --- Register addition of these properties in the parent: parentCell->addTask(parentMultiNodeProp)
addMultiNodePropLowerRecur( )
    Add multi node property in cell and in cells lower in hierarchy recursively;
    Given: multiNodeProp
    - For each node, property in multiNodeProp, assign property to node: assignNodeProp(node, prop)
    // Collect node properties per instance
    - Create multi node properties per instance multiNodePropPerInst
    - For each node, property in multiNodeProp:
    -- If property is not propagate down, continue to next node, property
    -- For each instPort in node:
    --- Get instance port node portNode that connects to node
    --- If the property is already in portNode, continue to next node, property
    --- Add portNode, property to multiNodePropPerInst for current instance
    - For each inst, instMultiProp in multiNodePropPerInst add multi node property in instance:
    -- inst->addMultiNodePropDownRecur(instMultiProp)
addMultiHierCellProp( )
    Add multiple properties of cell and of cells below
    Given: multiHierProp
    Assume:
    • properties are not set
    • cell is unmanaged
    // Add properties in this cell
    - For each hierarchy, property in multiHierProp:
    -- If hierarchy is empty, add cell property: assignCellProp(prop)
    // Add multi hierarchy property in cells lower in hierarchy

```
        - addMultiHierCellPropLowerRecur(multiHierProp)
addMultiHierCellPropLowerRecur( )
        Add multi hier property in cells lower in hierarchy
recursively.
        Given: multiHierProp
        // Collect multi hierarchy properties per instance
        - Create map multiHierPropPerInst from instance to
collection of hierarchical properties to be distributed
down to the instance
        - For each hierarchy, property in multiHierProp:
        -- If hierarchy is empty:
        --- If property is not to be distributed down,
continue to next hierarchy, property
        --- For each instance, if it does not have the
property:
        ---- Add property with no hierarchy for instance in
multiHierPropPerInst
        -- Else:
        --- Get top instance topFoldInst from hierarchy
        --- Set hierarchy inside instance instHier to
hier.popFront( )
        --- Add instHier, property to hierarchical properties
for topFoldInst in multiHierPropPerInst
Class CtxInst addMultiNodePropDownRecur( )
        Set multiple properties of instance nodes and
distribute down the properties addition.
        Assume:
        • Properties are not set
        • The instance parent cell is unmanaged
        • The instance master is managed
        Given: multiNodeProp
        // If already changed this instance master by addition
of these property on these nodes (CtxCell::nodeChangeMap),
and the new context master is valid, replace master with
the master after addition
        - targetMaster = master->getChangeCell(multiNodeProp)
        - If have targetMaster:
        -- replaceMaster(newMaster)
        -- Return
        // Split master and change it
        - model->splitMaster(this)
        // Add multi node property in cells lower in hierarchy
        // Note the master is the new master now
        - master->addMultiNodePropLowerRecur(multiNodeProp)
        - model->manageCell(_master)
        // Save to which cell the master changes when multi
node property added in case oldMaster is still valid
        - oldMaster->saveChangeCell(multiNodeProp,master)
```

The configuration of computer system 200 illustrated in FIG. 2, including units and sub-units thereof; flowchart 300, illustrated in FIGS. 3A, 3B the example hierarchy tree illustrated in FIG. 1 and the example circuits illustrated in FIGS. 4A through 4D, are example configurations, flowcharts, hierarchy trees and circuits that are depicted purely for the sake of conceptual clarity. Any other suitable configurations, flowcharts, hierarchy trees and circuits can be used in alternative embodiments.

Although the embodiments described herein mainly address ERC testing, the methods and systems described herein can also be used in other applications, such as in Design Rule Check (DRC), Layout versus Schematics (LVS), early design analysis and logic simulations.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for checking electrical rules in a design of a circuit comprising transistors connected by nodes, the method comprising:
    defining a hierarchical database comprising (i) a root representing the circuit, and (ii) instances of context-cells representing design entities and comprising node-ports that connect the design entities;
    propagating electrical properties of the node-ports from the root through the node-ports to at least a portion of the context-cells;
    propagating the electrical properties, which were propagated from the root, from one or more of the context-cells to one or more peer context-cells;
    identifying in the database a plurality of the context cells that represent instances of the same design entity;
    selecting, from among the plurality of the context cells that represent the instances of the same design entity, a subset of context cells that receive identical electrical properties for the design entity;
    evaluating only a single instance of the design entity with the identical electrical properties, and refraining from evaluating other instances of the design entity having the identical electrical properties; and
    identifying an electrical rule violation in at least one of the context-cells in the subset, based on the evaluated single instance of the design entity.

2. The method according to claim 1, wherein propagating the electrical properties to the peer context- cells comprises propagating the electrical properties from one or more of the context-cells to one or more intermediate-cells in the hierarchical database, and propagating the electrical properties from the intermediate-cells to the peer context-cells.

3. The method according to claim 1, wherein identifying the electrical rule violation comprises determining a source of the electrical rule violation in the circuit, by back-tracing the violation through the hierarchical database.

4. An apparatus for checking electrical rules in a design of a circuit comprising transistors connected by nodes, the apparatus comprising:
    a memory, to store a hierarchical database comprising (i) a root representing the circuit, and (ii) instances of context-cells representing design entities and comprising node-ports that connect the design entities; and
    a processor, to:
        propagate electrical properties of the node-ports from the root through the node-ports to at least a portion of the context-cells;
        propagate the electrical properties, which were propagated from the root, from one or more of the context-cells to one or more peer context-cells;
        identify in the database a plurality of the context cells that represent instances of the same design entity;
        select, from among the plurality of the context cells that represent the instances of the same design entity, a subset of context cells that receive identical electrical properties for the design entity;
        evaluate only a single instance of the design entity with the identical electrical properties, and refrain from evaluating other instances of the design entity having the identical electrical properties; and identify an electrical rule violation in at least one of the context-cells in the subset, based on the evaluated single instance of the design entity.

5. The apparatus according to claim 4, wherein the processor is to propagate the electrical properties to the peer context-cells by propagating the electrical properties from one or more of the context-cells to one or more intermediate-cells in the hierarchical database, and propagating the electrical properties from the intermediate-cells to the peer context-cells.

6. The apparatus according to claim 4, wherein the processor is to determine a source of the electrical rule violation in the circuit, by back-tracing the violation through the hierarchical database.

7. A computer software product, the product comprising a tangible non-transitory computer-readable medium in which program instructions are stored, which instructions, when read by a processor, cause the processor to:

define a hierarchical database comprising (i) a root representing the circuit, and (ii) instances of context-cells representing design entities and comprising node-ports that connect the design entities;

propagate electrical properties of the node-ports from the root through the node-ports to at least a portion of the context-cells;

propagate the electrical properties, which were propagated from the root, from one or more of the context-cells to one or more peer context-cells;

identify in the database a plurality of the context cells that represent instances of the same design entity;

select, from among the plurality of the context cells that represent the instances of the same design entity, a subset of context cells that receive identical electrical properties for the design entity;

evaluate only a single instance of the design entity with the identical electrical properties, and refrain from evaluating other instances of the design entity having the identical electrical properties; and identify an electrical rule violation in at least one of the context-cells in the subset, based on the evaluated single instance of the design entity.

8. The product according to claim 7, wherein the instructions cause the processor to propagate the electrical properties to the peer context-cells by propagating the electrical properties from one or more of the context-cells to one or more intermediate-cells in the hierarchical database, and propagating the electrical properties from the intermediate-cells to the peer context-cells.

9. The product according to claim 7, wherein the instructions cause the processor to determine a source of the electrical rule violation in the circuit, by back-tracing the violation through the hierarchical database.

* * * * *